United States Patent [19]

Moore

[11] Patent Number: 5,014,866

[45] Date of Patent: May 14, 1991

[54] INSULATION SEAL FOR INSPECTION HOLES

[76] Inventor: Charles F. Moore, 13411 Butterfly La., Houston, Tex. 77079

[21] Appl. No.: 448,714

[22] Filed: Dec. 11, 1989

[51] Int. Cl.$^5$ ............................................. B65D 39/00
[52] U.S. Cl. ................................. 215/364; 220/352; 220/661; 220/DIG. 19; 138/89; 138/90
[58] Field of Search ....... 220/233, 307, 357, DIG. 19, 220/352; 215/361, 364; 138/89, 90

[56] References Cited

U.S. PATENT DOCUMENTS

| | | | |
|---|---|---|---|
| 3,073,473 | 1/1963 | Davidson | 215/364 |
| 3,207,184 | 9/1965 | Lambert | 138/89 |
| 3,451,583 | 6/1969 | Lee, II | 138/89 X |
| 3,658,096 | 4/1972 | Higuera | 138/90 |
| 3,827,462 | 8/1974 | Celesta | 138/90 |
| 3,828,968 | 8/1974 | Kask | 138/89 X |
| 3,964,339 | 6/1976 | Antonio et al. | 138/89 X |
| 4,091,842 | 5/1978 | Greenawalt et al. | 138/90 |
| 4,170,247 | 10/1979 | Bates | 138/89 |

Primary Examiner—Stephen Marcus
Assistant Examiner—Nova Stucker

[57] ABSTRACT

A simplified installation method is provided in this improved insulation seal for inspection holes. The sealing assembly consists of a compressible elastomeric flanged hollow sleeve which is first inserted into the inspection hole. A rigid metal cup-shaped plug then inserted into the sleeve forms tight weatherproof seals in downward and outward directions against the insulation jacket. No special installing tools are needed and the seal is adaptable to severely corrugated, or other non-flat, insulation jackets. Primary exposure of the metal plug protects the assembly against sand blasting and other external wear. The seal is easily removed for reuse upon later inspections.

1 Claim, 1 Drawing Sheet

INSULATION SEAL FOR INSPECTION HOLES

BACKGROUND OF THE INVENTION

1. Field of the Invention

This invention relates in general to seals and more specifically to insulation sealing devices for inspection holes.

Safety precautions and legal duties often require periodic inspection of insulated process equipment (i.e. tanks, tank cars, pipelines, etc.) for evaluation of wall thickness or deterioration due to corrosion/or erosion. Non-destructive testing (NDT), such as ultrasonics, are periodically made for such determinations. Holes are cut through the insulation to facilitate the inspection and are quickly closed after test completion. The tests are periodically repeated to maintain progressive status at the designated location. Principally, the seals should be weatherproof, easily installed, and reusable.

2. Prior Art

Higuera, U.S. Pat. No. 3,658,096 provided a spring-secured insulation plug. This patent was modified in Elesta, U.S. Pat. No. 3,827,462. Greenawalt, U.S. Pat. No. 4,091,842 then substituted a swage-securing arrangement.

These insulation seal invention have insuffiencies in various degrees in (1) involving complex spring and swage arrangements to secure the seals, (2) requiring special installation tools, such as for swaging, (3) allowing primary exposure of elastomeric material subject to deterioration by sand-blasting and other external wear, (4) requiring adhesives or caulking, and (5) involving limited weather sealing ability, particularly with corrugated insulation jackets.

SUMMARY OF THE INVENTION

The objective of this invention is aimed principally at a more simplified method for installing insulation seals for ispection holes, resulting in this new design, which in addition, reduces other aforementioned seal insufficiencies.

This invention is a seal assembly comprised of two parts, (1) an elastomeric cylindrical flanged hollow sleeve, installed first and (2) an essentially-rigid metal cylindrical flanged cup-shaped plug, pressed in secondly.

The sleeve flange underside is capable of creating an initial downward seal against flat or slightly curved jacket surfaces on the outside of the insulation. Since many insulated surfaces are covered with a corrugated metal jacket, a secondary seal is required to provide vapor tight conditions between the sleeve and insulation jacket; the plug covers the entire sleeve.

A weatherproof seal, as well as an anchoring connection between the sleeve and the insulation is made when the plug is installed, compressing the sleeve outwardly against the insulation jacket and insulation. In addition, the initial downward seal of the elastomeric flange on the insulation jacket is thus further tightened. This anchoring and sealing is affected without disturbing the insulation or requiring special installing tools nor adhesive-sealants. Removal of the plug allows the sleeve to decompress and be readily removed from the insulation for later reinspection and reuse.

DETAILED DESCRIPTION

A round hole cut through the insulation and its jacket for inspection of the vessel wall is of a predetermined diameter and large enough to receive the sleeve, or inspection tools.

A. The Sleeve

Figure 2:
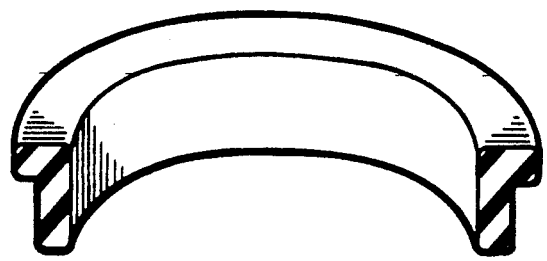
FIG. 2 is a perspective, cross sectional view of the elastomeric flanged cylindrical sleeve of the sealing assembly of this invention.

Referring to FIG. 2, the sleeve is a flanged one-piece hollow cylinder having a hardness measured on the Shore A scale. It is usually an elastomer but could be made of other polymers. It is usually made of 40–60 durometer ozone protected material compatible with the intended environment. Very high temperature, radioactive or cyrogenic applications require different elastomers. Flange and wall thickness are perdetermined to suit the hole to be drilled into the insulation. The sleeve flange lip has a radius underside and flat top side extending outwardly from the top of the sleeve over and on top of the adjacent uncut insulation jacket.

B. The Plug

Figure 1:
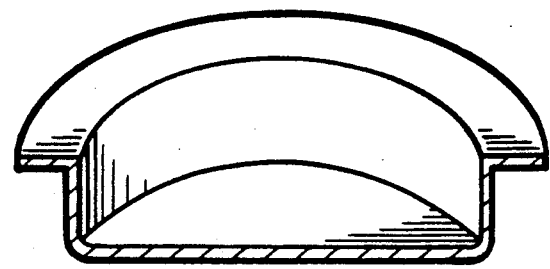
FIG. 1 is a perspective view of the essentially rigid metal cylindrical flanged cup-shaped plug of the sealing assembly of this invention.

Referring to FIG. 1, the plug is a one-piece cylindrical essentially rigid metal solid bottom flanged cup made to a predetermined diameter and depth. It can be made of any material or thickness, rigid and compatible to suit the intended service. Material like the vessel insulation jacket is often requested to provide like appearance. The plug is a shallow cup with an annular flat flange extending outwardly around the entire outside diameter a predetermined distance, covering the sleeve flange. The cup portion of the plug is made a predetermined diameter larger than the sleeve inside diameter to facilitate compression of the elastomeric sleeve upon insertion of the plug.

C. The Sealing Assembly

Figure 3:
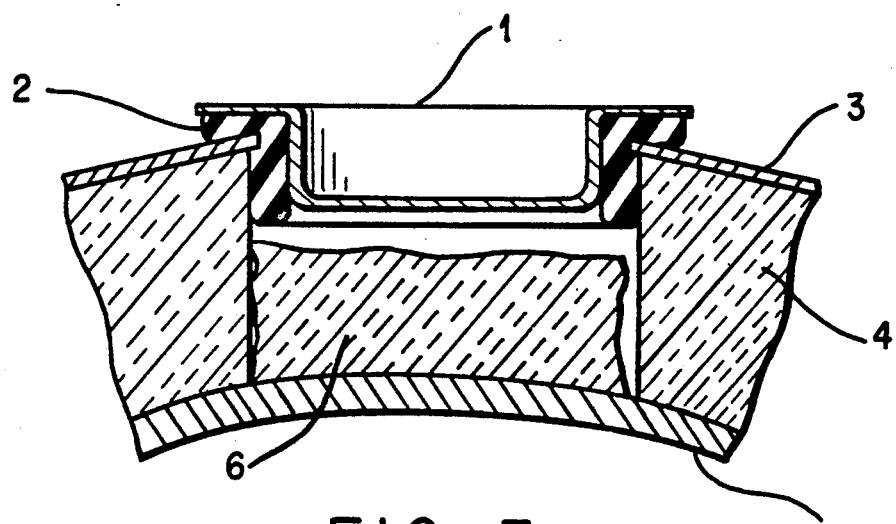
FIG. 3 is a side view, taken in cross-section, of the sealing assembly of this invention installed in the inspection hole.

Referring to FIG. 3, this side view, shown in cross-section, depicts the sealing assembly installed in an inspection hole cut through the insulation jacket reference character 3 and insulation reference character 4 reaching vessel or pipe wall reference character 5. Elastomeric sleeve reference character 2 is first inserted, followed by insertion of the metal plug reference character 1; these insertions are readily made by hand. Replaced insulation is represented by reference character 6.

After the inspection is completed and the hole ready to be closed, the sleeve is first inserted in the hole as far as the flange will permit, and then the plug is pressed inside the sleeve by hand. No tools or added force is necessary for this installation. The outer seal is affected in the compression of the elastomeric sleeve by the metallic plug. This seal is equally weatherproof when installed on flat or corrugated jackets. The cylindrical shape and uniform thickness of the sleeve and plug provide like compression of the sleeve wherever it contacts the jacket. The plug is weathersealed completely over its entire length when installed in the sleeve due to the oversize interference design. Due to the tight fit, removal of the plug may require the help of a blade-type screwdriver or knife inserted under the flange of the plug; accordingly, tampering or casual removal of the plug is not possible, but it may be removed and resealed numerous times without loss of weatherproof sealing properties due to its elastomeric memory and interference design. The lip of the plug is thin and flat. Once installed in the sleeve, the plug is securely set in the anchored sleeve.

It is recommended that most of the insulation removed when drilling the inspection hole be replaced before installing this sealing assembly. This added insulation will protect the sleeve from severe temperatures which could cause accelerated deterioration.

I claim:

1. A seal for use in holes drilled in metal jacket covered insulation made while performing non-destructive tests and inspections composed of:

a. an elastomeric cylindrical sleeve having inner and outer walls and a flange extending outwardly from one end thereof;
b. said flange of said sleeve having a flat upper surface extending perpendicularly to said sleeve and a lower substantially convex surface extending from said outer wall of said sleeve to said upper surface of said flange;
c. a plug for insertion into said sleeve comprising a cylindrical wall and having a solid bottom at one end thereof and a flat flange extending perpendicularly to said cylindrical wall of said plug at the opposite end;
d. said cylindrical wall of said plug having an outside diameter larger than the inner diameter of said sleeve for radially expanding said cylindrical section of said sleeve to provide a secure seal when said sleeve and said plug are consecutively inserted into a hole in metal jacket covered insulation;
e. said flat flange of said plug being sized to fully cover and thereby protect said flat upper surface of said flange of said sleeve from weather and ultraviolet light.

* * * * *